US011089763B2

(12) United States Patent
Heintz

(10) Patent No.: US 11,089,763 B2
(45) Date of Patent: Aug. 17, 2021

(54) EQUINE YOKE CLOSURE DEVICE AND ADJUSTABLE BLANKET SYSTEM

(71) Applicant: Pamela Sue Heintz, Clayton, OH (US)

(72) Inventor: Pamela Sue Heintz, Clayton, OH (US)

(*) Notice: Subject to any disclaimer, the term of this patent is extended or adjusted under 35 U.S.C. 154(b) by 182 days.

(21) Appl. No.: 16/155,356

(22) Filed: Oct. 9, 2018

(65) Prior Publication Data
US 2019/0104706 A1 Apr. 11, 2019

Related U.S. Application Data

(60) Provisional application No. 62/569,882, filed on Oct. 9, 2017.

(51) Int. Cl.
A01K 13/00 (2006.01)
A44B 13/00 (2006.01)

(52) U.S. Cl.
CPC ........ A01K 13/008 (2013.01); A44B 13/0029 (2013.01); A44B 13/0052 (2013.01)

(58) Field of Classification Search
CPC ...... A01K 13/008; A01K 13/006; B68C 5/00; A44B 13/0029; A44B 13/0052
USPC .......................... 54/79.1, 79.2, 79.4; 119/850
See application file for complete search history.

(56) References Cited

U.S. PATENT DOCUMENTS

| 131,978 A | 10/1872 | Springer | |
|---|---|---|---|
| 227,328 A | 5/1880 | Wallin | |
| 444,032 A | 1/1891 | Whitaker | |
| 1,335,032 A * | 3/1920 | Seator | A01K 13/008 54/79.2 |
| 1,425,301 A * | 8/1922 | Warneford | A01K 13/008 54/79.2 |
| 5,125,220 A | 6/1992 | Martin | |
| 5,161,352 A | 11/1992 | Schneider | |
| 5,271,211 A * | 12/1993 | Newman | A01K 13/008 54/79.2 |
| 5,839,395 A | 11/1998 | Kelley | |
| 7,231,754 B2 | 6/2007 | Hathcock | |
| 7,637,087 B1 * | 12/2009 | Graham | A01K 13/008 54/79.1 |
| 8,302,371 B2 | 11/2012 | MacGuinness | |
| 9,107,388 B2 * | 8/2015 | Howell | A01K 27/002 |

(Continued)

FOREIGN PATENT DOCUMENTS

| DE | 202011002622 | 12/2011 |
|---|---|---|
| GB | 2319161 | 5/1998 |

Primary Examiner — Magdalena Topolski
Assistant Examiner — Shada Mohamed Alghailani
(74) Attorney, Agent, or Firm — Stephen T. Murphy Law LLC; Peter D. Meyer; Stephen T. Murphy

(57) ABSTRACT

A yoke device for a horse having a neck, a back, a barrel, a dock, a withers, a chest, a mane, at least one shoulder, a point of said at least one shoulder, a forearm, and at least one scapula is disclosed. The yoke device comprises a material having a "Y" shape, a belly end, a withers end, and a main body portion. The withers end comprises a pair of elongate strips splaying outwardly from a central point disposed within the main body portion and forming a neck opening therebetween. The pair of elongate strips circumscribe the neck of the horse when the elongate strips are disposed about the neck of the horse. The main body portion overlaps the chest of the horse when the main body portion of the yoke device is disposed in overlapping engagement with the chest of the horse.

13 Claims, 15 Drawing Sheets

(56) References Cited

U.S. PATENT DOCUMENTS

| | | | | |
|---|---|---|---|---|
| 2004/0237480 A1* | 12/2004 | Keiner | ............... | A01K 13/008 54/79.2 |
| 2006/0096551 A1* | 5/2006 | Brewington | ........... | A01K 23/00 119/850 |
| 2006/0101792 A1 | 5/2006 | Chang | | |
| 2008/0110414 A1 | 5/2008 | Buehner | | |
| 2008/0216454 A1 | 9/2008 | Lacow | | |
| 2010/0043724 A1* | 2/2010 | Sherer | ................. | A01K 13/006 119/850 |
| 2011/0226193 A1* | 9/2011 | Williams | ............... | A01K 23/00 119/850 |
| 2011/0247187 A1* | 10/2011 | Smalley | ............... | A01K 13/008 29/401.1 |
| 2013/0263561 A1 | 10/2013 | Caston | | |
| 2015/0007528 A1* | 1/2015 | Landrith | .................. | A61F 7/02 54/68 |
| 2017/0013804 A1* | 1/2017 | Fachner, Sr. | ......... | A01K 27/001 |
| 2017/0099807 A1* | 4/2017 | Northrop | ............. | A01K 13/006 |
| 2017/0118956 A1* | 5/2017 | Evanko | ................ | A01K 13/007 |
| 2018/0343832 A1* | 12/2018 | MacGuinness | ...... | A01K 13/008 |
| 2019/0133077 A1* | 5/2019 | Beck | ..................... | A01M 29/24 |
| 2019/0200572 A1* | 7/2019 | Criswell | ............ | A01K 27/002 |
| 2019/0364847 A1* | 12/2019 | Mills | ................... | A01K 13/006 |
| 2020/0205379 A1* | 7/2020 | Leek | .................... | A01K 27/002 |
| 2020/0352133 A1* | 11/2020 | Blizzard | ............. | A01K 13/006 |
| 2020/0352137 A1* | 11/2020 | Boyce | .................. | A01K 21/00 |

\* cited by examiner

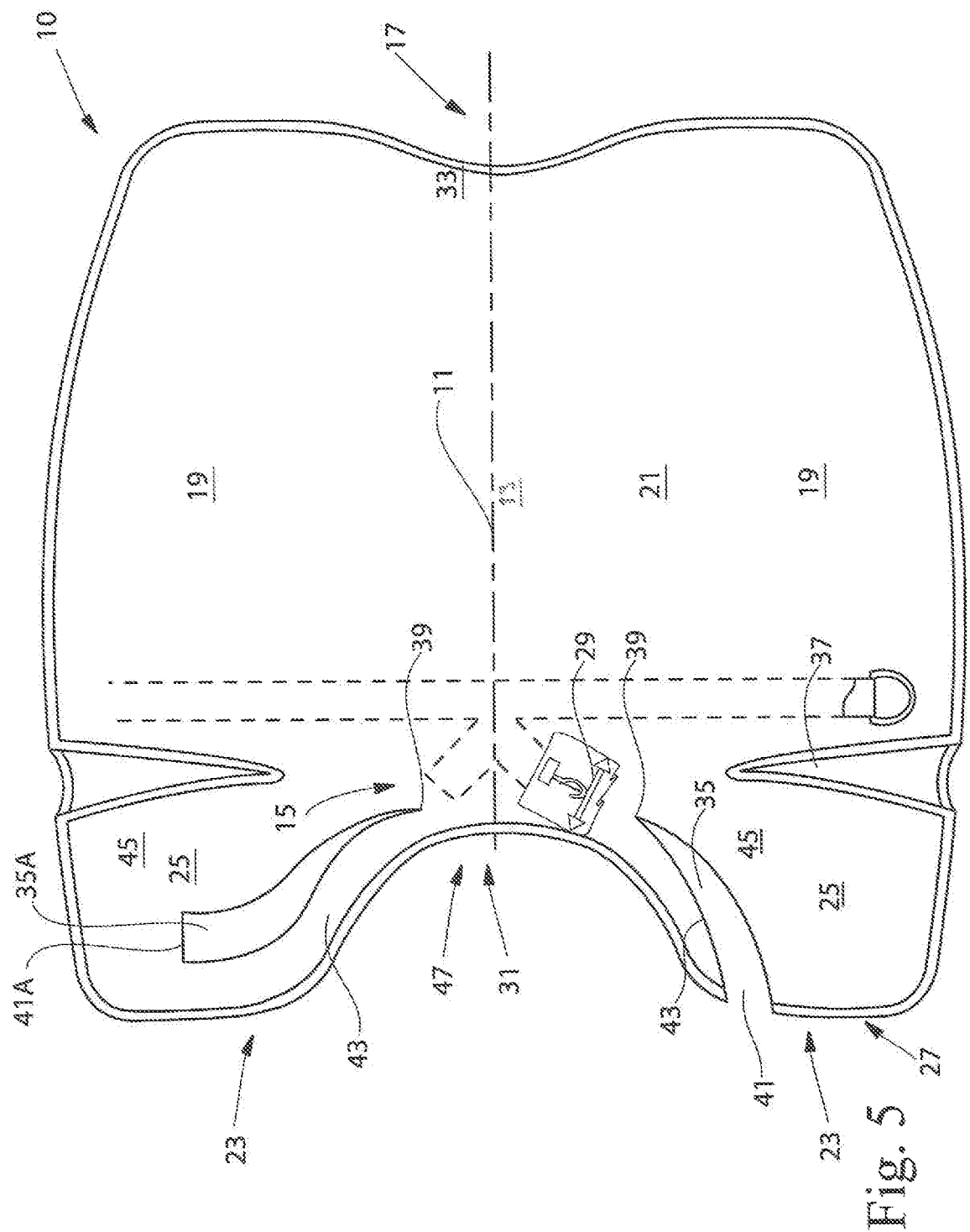

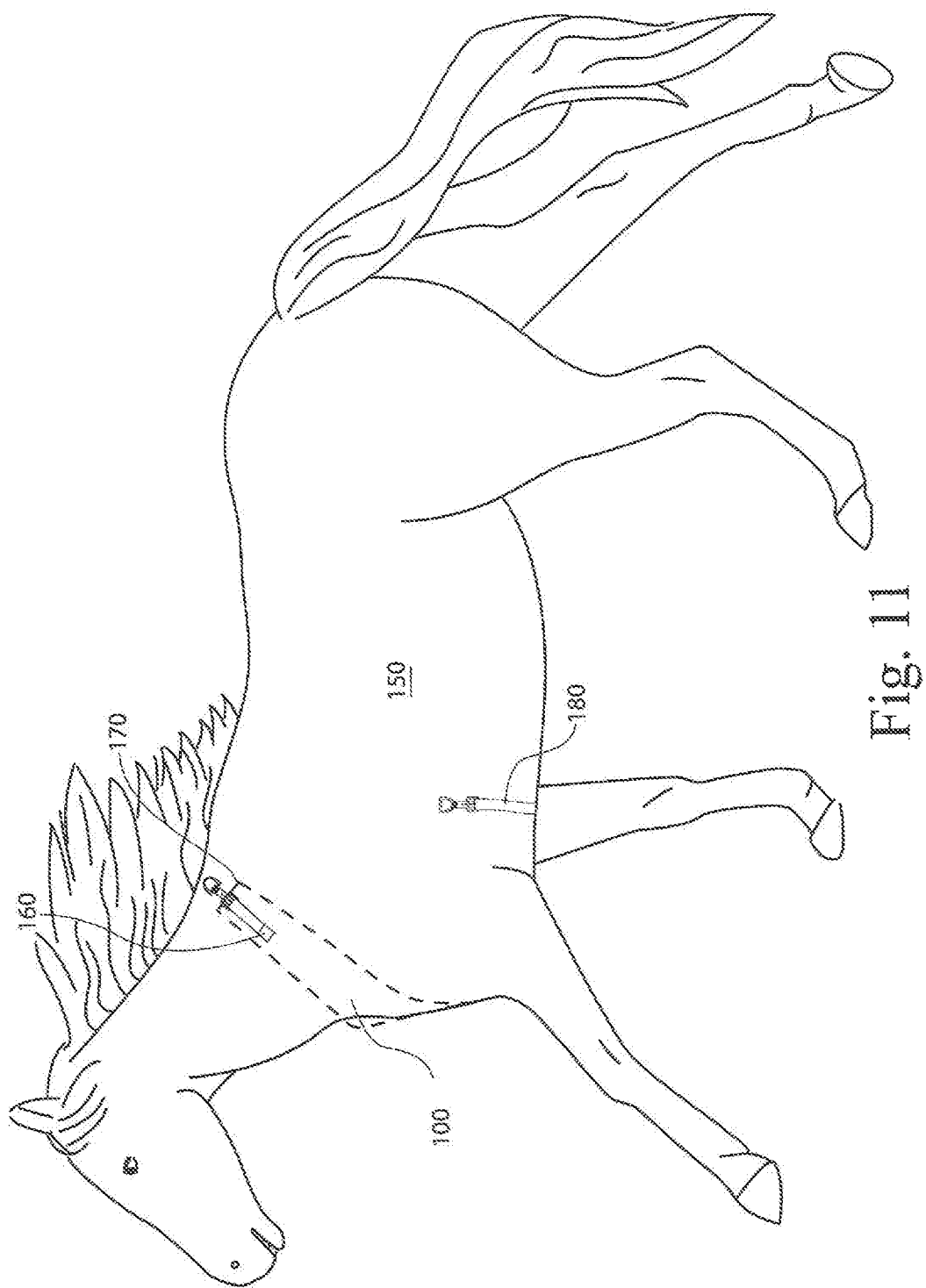

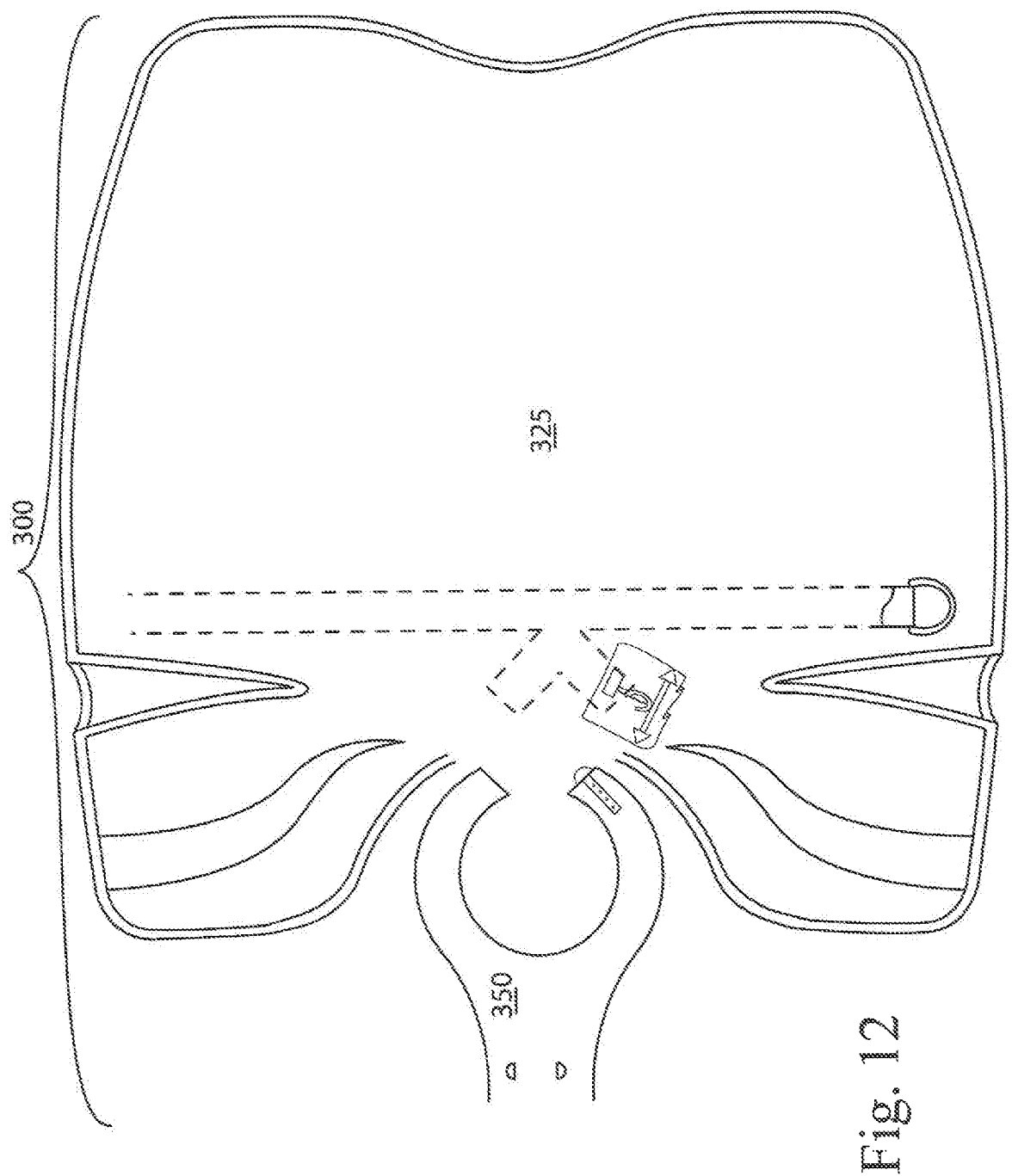

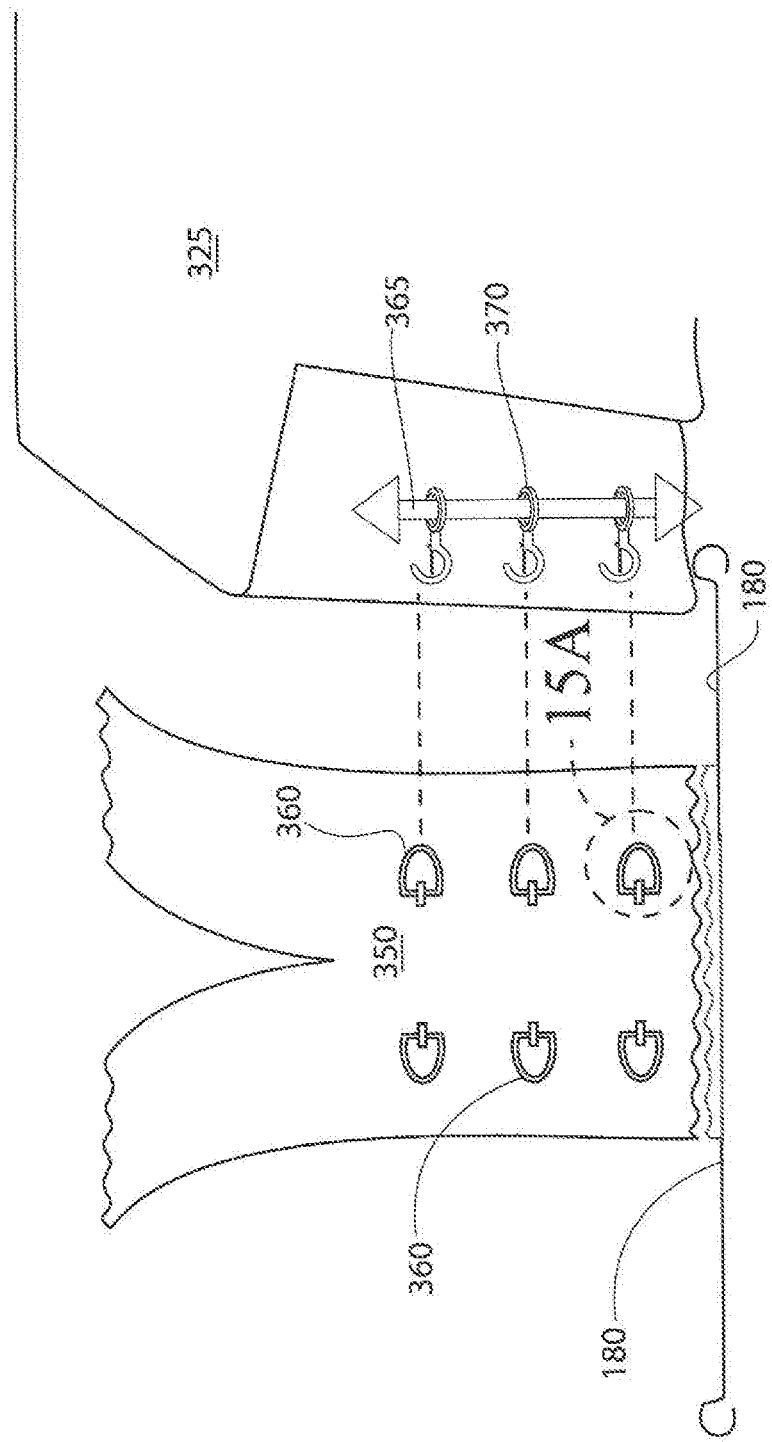

EQUINE YOKE CLOSURE DEVICE AND ADJUSTABLE BLANKET SYSTEM

FIELD OF THE INVENTION

The present disclosure relates to specialized equipment (e.g., blankets and such) for covering and protecting animals such as horses (*Equus ferus caballus*). More particularly, the present disclosure provides for a newly developed yoke closure device and an adjustable blanket system suitable for use with *Equus ferus caballus*.

BACKGROUND OF THE INVENTION

The horse (*Equus ferus caballus*) is one of two extant subspecies of *Equus ferus*. It is an odd-toed ungulate mammal belonging to the taxonomic family Equidae. Horses in the subspecies *caballus* are domesticated. There is an extensive, specialized vocabulary used to describe equine-related concepts, covering everything from anatomy to life stages, size, colors, markings, breeds, locomotion, and behavior.

Horses' anatomy enables them to make use of speed to escape predators and they have a well-developed sense of balance and a strong fight-or-flight response. Related to this need to flee from predators in the wild is an unusual trait: horses can sleep both standing up and lying down.

Horse breeds are loosely divided into three categories based on general temperament: spirited "hot bloods" with speed and endurance; "cold bloods", such as draft horses and some ponies, suitable for slow, heavy work; and "warmbloods", developed from crosses between hot bloods and cold bloods, often focusing on creating breeds for specific riding purposes, particularly in Europe. There are more than 300 breeds of horse in the world today, developed for many different uses.

Horses and humans interact in a wide variety of sport competitions and non-competitive recreational pursuits, as well as in working activities such as police work, agriculture, entertainment, and therapy. Horses were historically used in warfare, from which a wide variety of riding and driving techniques developed, using many different styles of equipment and methods of control. Humans provide domesticated horses with food, water and shelter, as well as attention from specialists such as veterinarians and farriers.

The discussion provided hereunder will reference to certain *Equus ferus caballus* anatomy. The requisite anatomy so referenced by the reader and one of skill in the art can be found in FIGS. 1 and 2 provided herein.

With reference to FIGS. 3-4, certain specialized equipment is used in the care of horses. During the winter months, horses are commonly turned out to pasture to feed on grass and hay and to exercise. A horse blanket (also called a turnout blanket or rug) is a blanket or animal coat intended for keeping the *Equus ferus caballus* warm, dry, and/or otherwise protected from wind or other elements. In some locales, a blanket is provided for a horse in a barn or stable as many barns are unheated. These are known as stable blankets and are contoured or tailored to fit the horse more snuggly than a turnout blanket. Stable blankets are commonly kept on a horse in cold temperatures when the horse is loose in a stall or on pasture as well as when traveling. Horse blankets having different weights are made for different weather conditions, and some are water-resistant or waterproof. Modern materials like those used in human outdoor wear can be used in horse blanket manufacture.

Generally, horse blankets are tailored in an attempt to fit around a horse's body and extend from the withers to the dock on top and from the chest through the barrel underneath. Often, the belly of the horse remains exposed. Cinch straps can cross underneath the belly to secure opposed sides of the blanket and allow the horse to move about. Some designs also have small straps that loop lightly around the horse's hind legs to prevent the blanket from slipping sideways. Also, some current blankets have a fastening system that comprises one or more buckles that fasten in front proximate to the chest to keep the blanket secure from falling off the back end of the horse.

One of skill in the art will readily recognize that current blanket designs are difficult to fit and indeed do not provide a good fit for most horses. It is believed that several factors contribute to the overall fit of any blanket design. To provide a well-fitting blanket, these factors should include: 1. The depth of the neck, 2. the width of the chest, and 3. the angle of the shoulder.

In an attempt to provide a good fit, some horse blankets have one or two chest flaps that extend from the blanket and are buckled in front proximate to the chest. However, these blankets really do not provide a good fit because they do not take the previously mentioned factors into account when undergoing the blanket design process. Further, these horse blanket designs do not provide an effective seal to prevent cold air from passing between the neck opening formed by the blanket and the neck. A few designs that have a closed front and are slipped over the head and neck can remedy this air leakage. However, these designs are considered to be the most difficult to provide a proper fit for any particular horse because there is no ability to adjust the blanket.

Conventional horse blankets can cause wear to occur on a horse's mane and tail. Some conventional blankets have synthetic webbing around the blanket edges. Such webbing may be abrasive and rub off the hair where there is pressure. When a blanket is placed on a horse, gravity creates a pressure point across the top of the neck where the mane is located. Wherever there is such a pressure applied to the horse, the constant rubbing causes hair to wear off and cause chafing which in turn can result in the development of edema.

Further, when conventional horse blankets are positioned as shown, the natural movement of the horse may cause an applied tension, T, in the blanket to occur. In other words, as the horse moves, e.g., walks, trots, gallops, or runs) the improperly fitted blanket otherwise disposed upon the horse tends to move rearward toward the dock and away from the withers and chest of the horse along a direction, x, parallel to the horse's spine. Additionally, regardless of the weather, most horses will roll on the ground, scratching their backs, stretching their muscles or even to simply roll in the dirt. Thus, current blankets are not really capable of keeping a horse clean, especially the belly. Further, the movement of an ill-fitted blanket can cause a great deal of rubbing on the chest, shoulders, and forearms of the horse disposed underneath the blanket and result in chafing, hair loss, and eventual edema.

Chafing refers to the irritation of skin caused by repetitive friction, usually generated through skin to skin contact of multiple body parts. Severe chafing is known as friction burn. Edema is an abnormal accumulation of fluid in the interstitium, located beneath the skin and in the cavities of the body, which can cause severe pain. Clinically, edema manifests as swelling. The amount of interstitial fluid is determined by the balance of fluid homeostasis; and the increased secretion of fluid into the interstitium, or the impaired removal of the fluid, can cause the condition.

In an effort to try to ameliorate the observed chafing, prior art horse blankets (such as those shown in FIGS. 3-4) can be fitted with vertically-oriented gussets (i.e., extending in the "y" direction) starting proximate to the shoulder and following the forearm. These vertically-oriented gussets are disposed within the side portions of the blanket, near the front legs of the horse. Each gusset is generally provided as a wedge-shaped piece of material.

However, the placement of these gussets within the side portions of the blanket do not alleviate the chafing/friction burn issues observed on the chest, shoulders, and forearms of the horse. Even in the presence of such vertically-oriented gussets, one of skill in the art can recognize that the ordinary gates of a moving horse still cause the blanket to experience the applied rearward tension, T, discussed supra, to occur. This tension in the blanket having such vertically-oriented gussets still causes a great deal of rubbing on the chest, shoulders, and forearms of the horse. The rubbing is not cured by the presence of any of the currently provided gussets disposed within the side portions of the horse blanket.

Thus, there is a clear need to provide a blanket for *Equus ferus caballus* that can reduce and even eliminate the rubbing, chafing, and edema issues caused by prior art blankets. There is a clear need to provide a blanket that considers the depth of the neck, the width of the chest, and the angle of the shoulder within the overall design. Additionally, there is a clear need to provide for a heretofore unseen device that can also more effectively hold the blanket in place thereby reducing the observed friction on the body of the horse in areas on the chest, shoulders, and forearms. This device should provide for the best possible fit of a horse blanket by allowing for the adjustment of the blanket required due to the depth of the neck the width of the chest, and the angle of the shoulder of the horse. This device should also be usable to assist in keeping the horse clean and/or warm the horse by attaching far enough back toward the belly of the horse. Additionally, the device should be integratable with existing horse blanket systems. Further, there is a clear need to provide an equine blanketing system that better warms the horse and reduces the development, presence or consequences of rubbing and any edema resulting therefrom.

SUMMARY OF THE INVENTION

The present disclosure provides for a yoke device for a horse having a neck, a back, a barrel, a dock, a withers, a chest, a mane, at least one shoulder, a point of said at least one shoulder, a forearm, and at least one scapula. The yoke device comprises a material having a "Y" shape and having a belly end, a withers end, and a main body portion. The withers end comprises a pair of elongate strips splaying outwardly from a central point disposed within the main body portion and forming a neck opening therebetween. The pair of elongate strips circumscribe the neck of the horse when the elongate strips are disposed about the neck of the horse. The main body portion overlaps the chest of the horse when the main body portion of the yoke device is disposed in overlapping engagement with the chest of the horse.

BRIEF DESCRIPTION OF THE DRAWINGS

FIG. 5 is a plan view of an exemplary horse blanket of the present disclosure;

FIG. 11 is a side perspective view of the exemplary yoke of FIG. 8 in cooperative association with a horse blanket;

FIG. 12 is a plan view of an exemplary Equine Adjustable Blanket System of the present disclosure;

DETAILED DESCRIPTION

The present description will be divided into four portions. The first portion of the present disclosure is directed toward a horse blanket. The second portion is directed toward a yoke device. The third portion is directed toward an adjustable blanket system. The fourth and final portion is directed toward a unique connecting device and a slidably moveable connector. While the present disclosure addresses the present disclosure relative to a horse, it would be readily recognized by one of skill in the art that the presently disclosed developments are also suitably useful for animals other than *Equus ferus caballus*. This can include, but not be limited to: cattle, dogs, cats, pigs, giraffes, elephants, and the like. In short, the presently described developments are suitable for use with virtually any animal including reptiles and mammals.

A. The Horse Blanket

The horse blanket (or blanket) provides for a back portion and a pair of opposed side portions. The back portion extends between a withers end and a dock end. The back portion has a longitudinal axis forming an axis of symmetry within the horse blanket. The pair of opposed side portions each extends from the back portion on opposed sides of the longitudinal axis. Each of the side portions has a front portion that overlay a respective shoulder of the horse when the horse blanket is disposed upon the horse. Each of the front portions also has a first gusset disposed therein. Each of the first gussets has a first end disposed within the front portion proximate to the longitudinal axis. The first end is disposed proximate to the withers when the horse blanket is disposed upon the horse. Each of the first gussets has a second end disposed distal from the first end. Each of the first gussets bifurcates the respective front portion into a neck portion and a scapula portion. The neck portion overlays the horse between the neck and the scapula when the horse blanket is disposed upon the horse.

Figure 1:
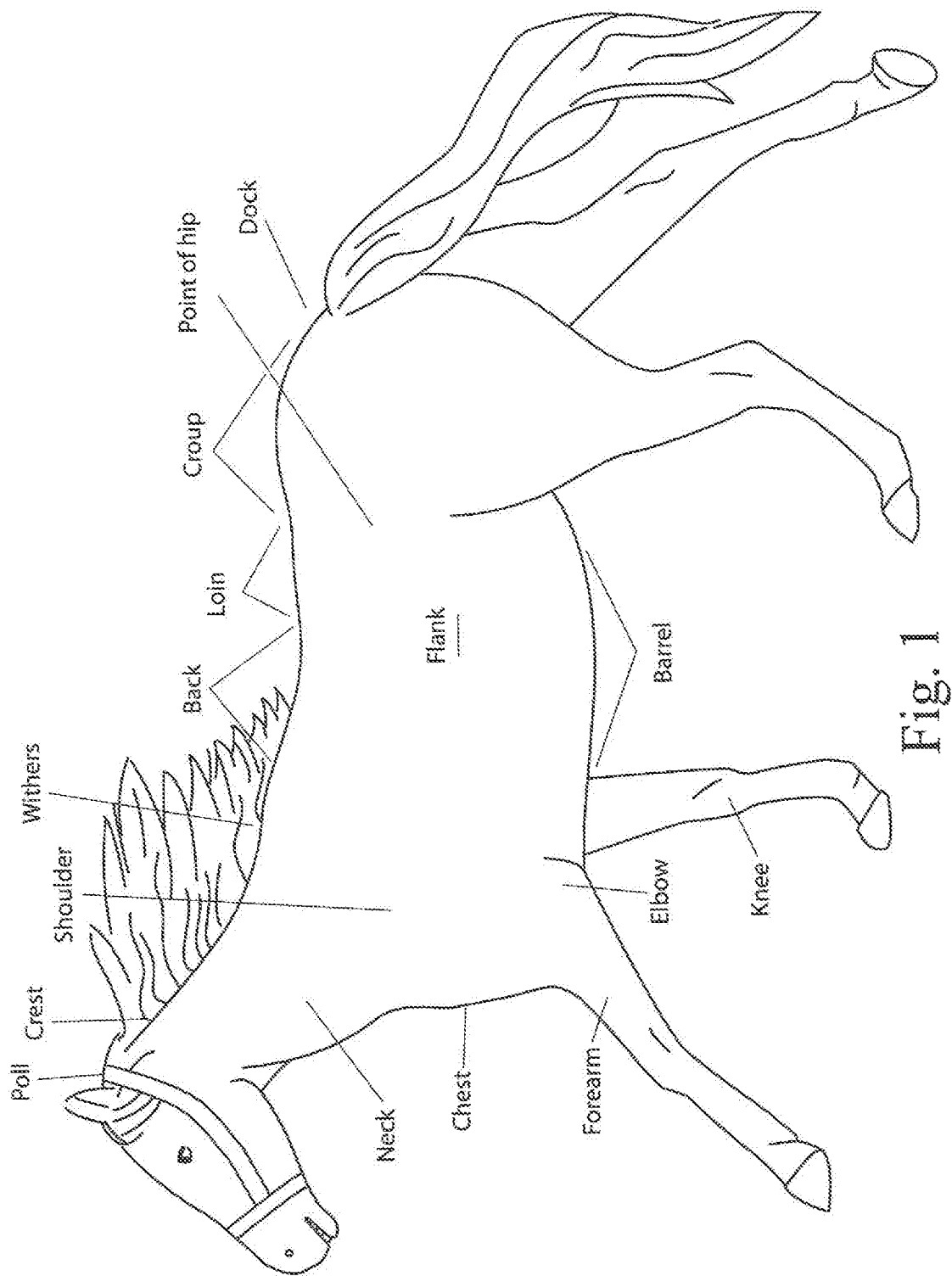
FIG. 1 is a side elevational view of an exemplary *Equus ferus caballus* (horse) detailing relevant portions of *Equus ferus caballus* anatomy.
Figure 2:
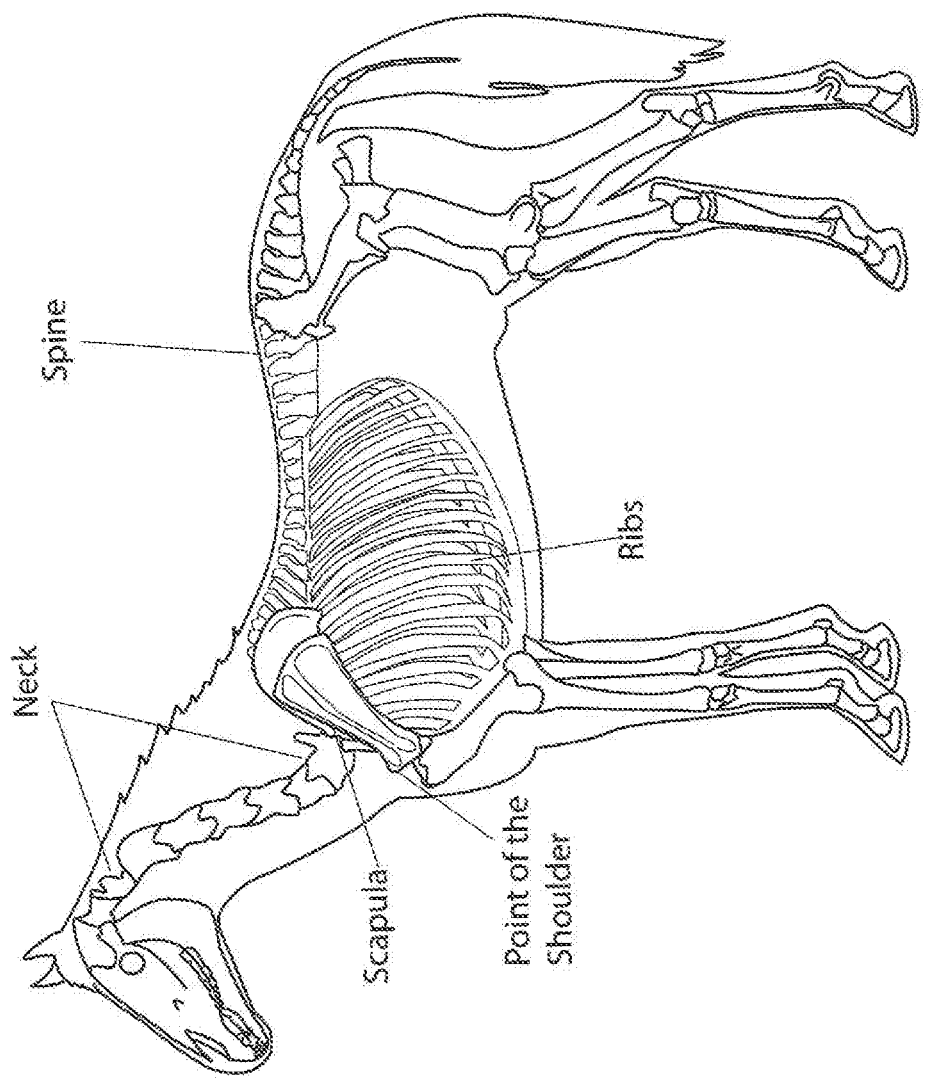
FIG. 2 is a side elevational view of the skeletal system of the exemplary *Equus ferus caballus* of FIG. 1.
Figure 3:
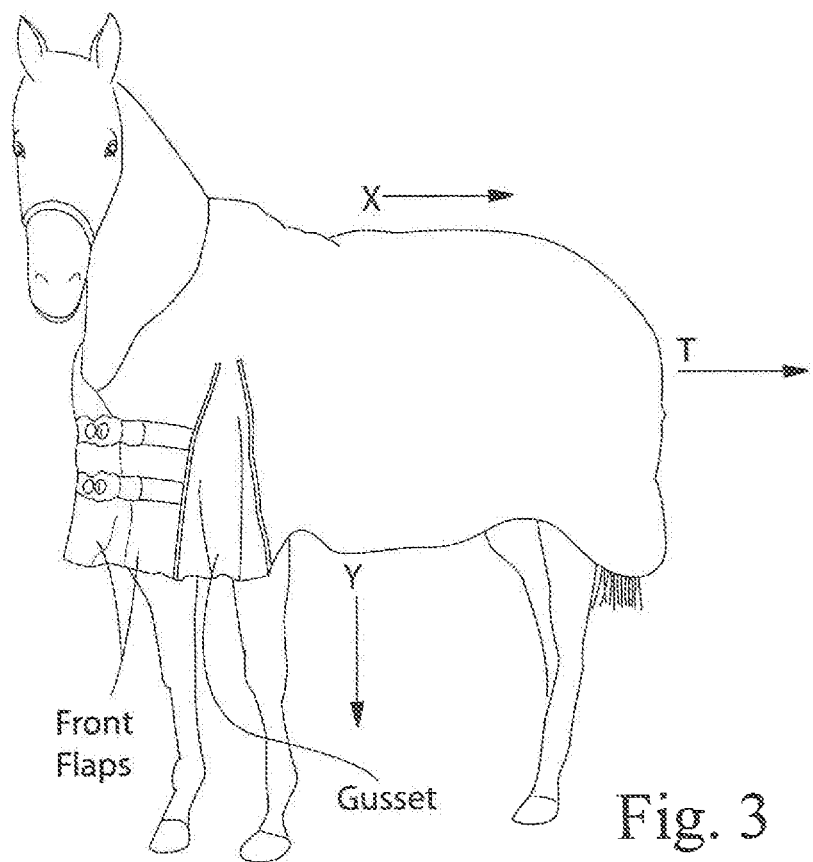
FIG. 3 is a side elevational view of an exemplary prior art horse blanket disposed upon another exemplary horse depicting the forces generated within the exemplary horse blanket attributed to motion of the horse.
Figure 4:
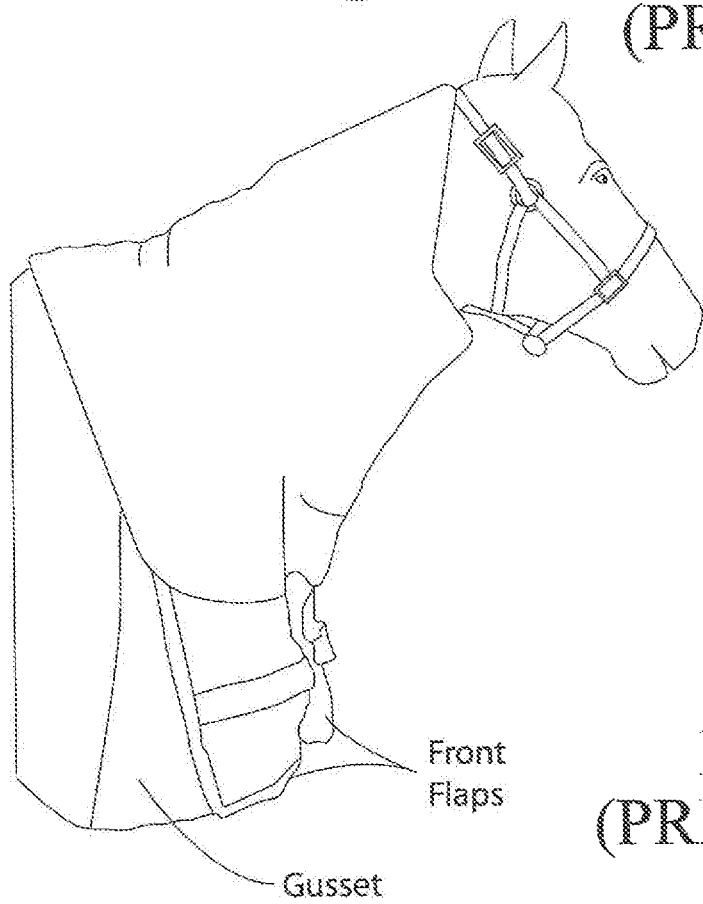
FIG. 4 is a side elevational view of yet another exemplary prior art horse blanket disposed upon yet another exemplary horse.
Figure 5A:
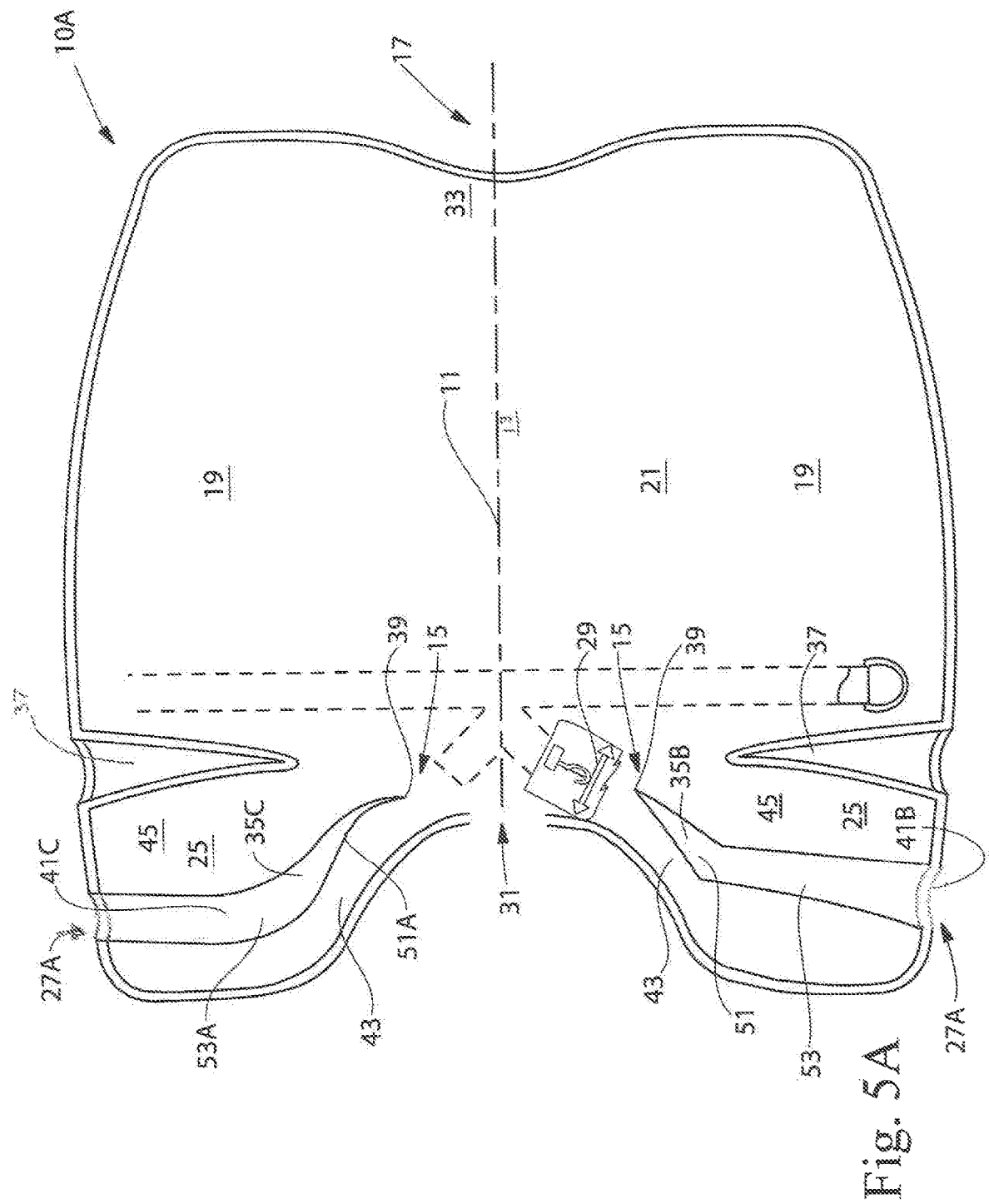
FIG. 5A is a plan view of an alternative exemplary horse blanket of the present disclosure.
Figure 6:
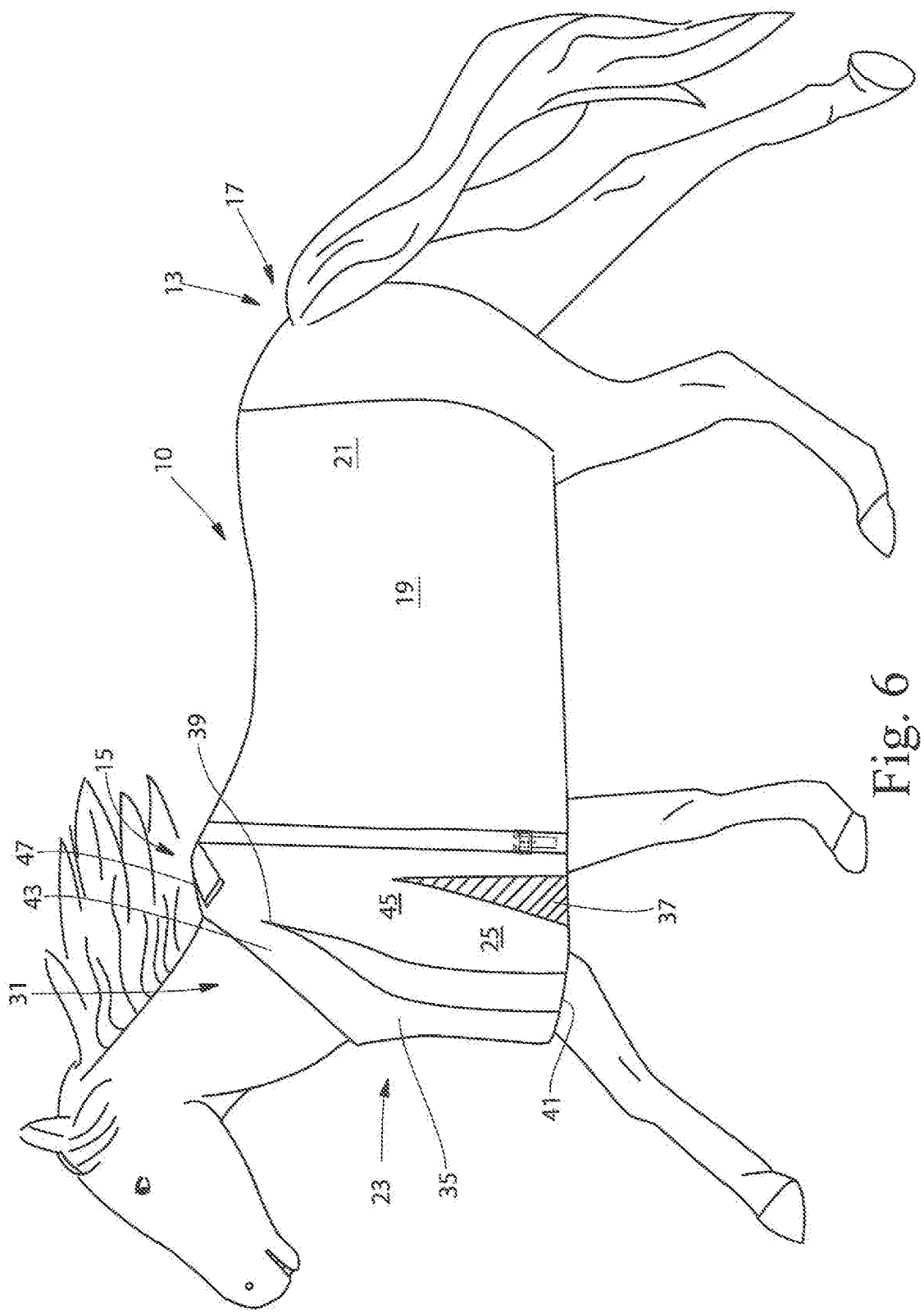
FIG. 6 is a side view of the blanket of FIG. 5 shown on a horse.
Figure 7:
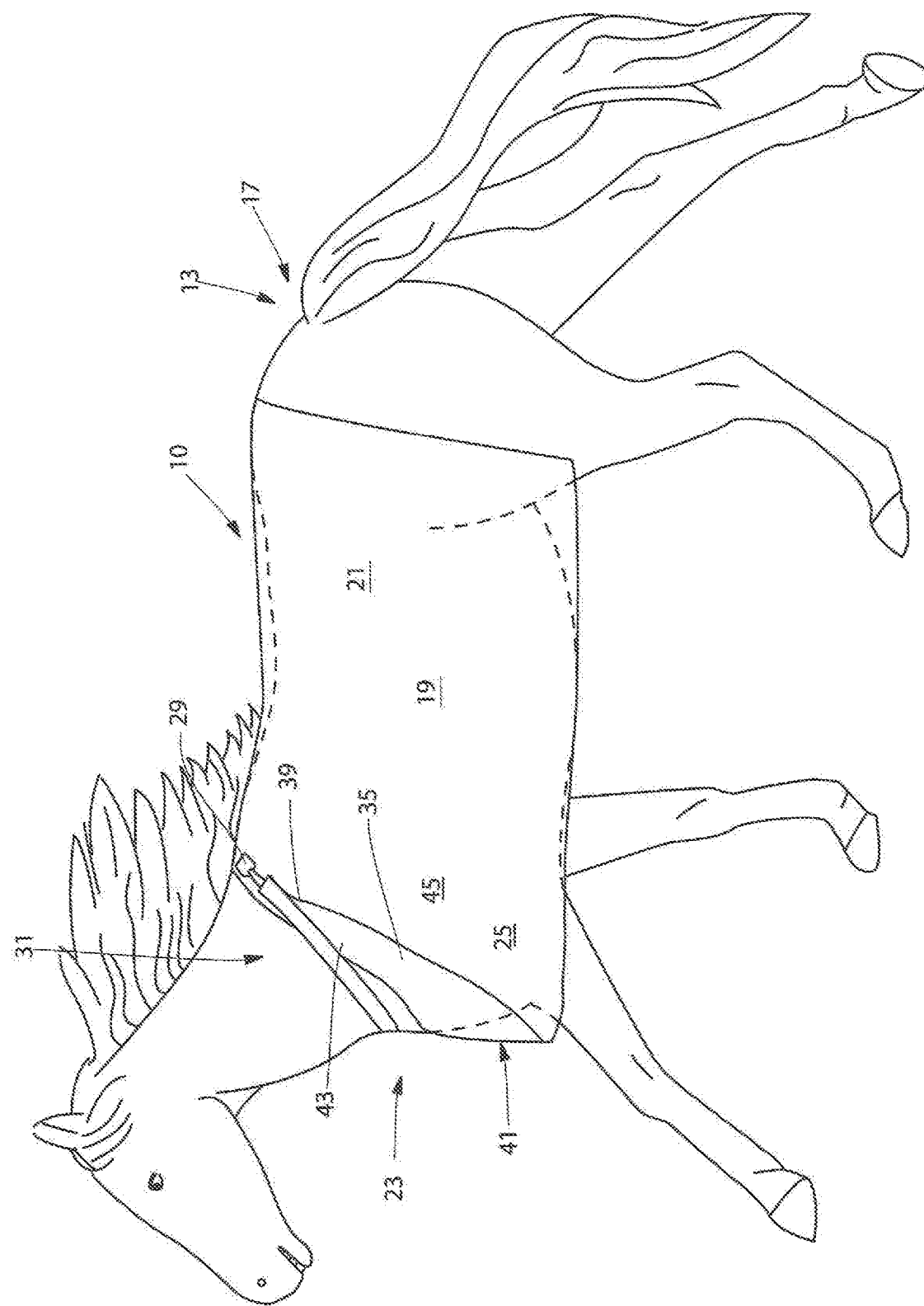
FIG. 7 is another alternative side view of the blanket of FIG. 5 shown on a horse.

FIGS. 5-7 show an exemplary horse blanket 10 (also referred to herein as blanket 10) of the present disclosure. The blanket 10 can be provided as a turnout blanket, a stable blanket, a cool-out blanket, or any other covering suitable for use on a horse or other animal that is turned out to pasture and/or exposed to the weather and/or ground-found debris elements.

The blanket 10 has a back portion 13 that extends between the withers end 15 and the dock end 17 of the blanket 10. The back portion 13 can be provided to generally follow the spine of the horse and has a longitudinal axis 11 that forms an axis of symmetry within the blanket 10. As would be readily recognized by one of skill in the art, the blanket 10 can be located to contact, or be aligned with, the horse's mane when the blanket is placed upon a horse. A pair of opposed side portions 19 each extend from the back portion 13 and are disposed on opposed sides of the longitudinal axis 11. When the blanket 10 is deployed upon a horse, the back portion 13 extends along the back of the horse, while each of the side portions 19 depend down along the sides of the horse from the longitudinal axis 11 about the barrel of the horse. The side portions 19 extend from the dock end 17 disposed proximate to the dock of the horse to the neck end 23 disposed proximate to the neck of the horse. Each respective side portion 19 can be provided with a front portion 25 and a barrel portion 21.

It may be preferred to provide each front portion 25 with a front edge 27 that are designed to overlap at least slightly with the opposed front edge 27 of the opposed front portion 25. It may be preferable to provide for the front portions 25 to cover at least a portion of the chest of the horse disposed below the neck. A neck opening 31 can be formed in the blanket 10 between the opposed front portions 25 and the withers end 15 of the back portion 13 by attachment of the respective front portions 25. The blanket 10 can be provided with a flap 33 disposed proximate to the dock end 17.

The two opposed front portions 25 are capable of being mutually coupled together to form neck opening 31. In other words, both opposed front portions 25 can be disposed and positionable into mutual connective engagement. By way of non-limiting example, the coupling of opposed front portions 25 can be accomplished by any technology understood by one of skill in the art to fasten one front portion 25 to the other. This can include using a strap and buckle or a plurality of hook and loop fasteners. For example, a strip of hooks can be disposed upon one front portion 25 and a strip of loops can be disposed upon the opposed front portion 25. When the opposed front portions are cooperatively overlapped, the hook and loop fasteners can retain the respective front portions 25 in cooperative and corresponding mating engagement. Alternatively, straps disposed on one front portion 25 can be secured to buckles disposed upon the opposed front portion 25. The straps can provide a more secure coupling than the hook and loop fasteners. The strap and buckle arrangements can be elasticized as desired in order to allow for stretch as the horse moves about or to accommodate a horse with a larger neck girth. In another embodiment, such straps can be provided as nylon webbing and the buckles can be secured to the blanket material by elastic straps to provide a desired degree of elasticity. Yet still "D"-rings (or other suitable connection devices) can be appropriately fastened to a surface of one front portion 25 and a corresponding snap fastened to the opposed front portion 25.

The blanket 10 can be also fitted with at least two first gussets (selectable in design and shown in FIG. 5 as exemplary first gusset 35 and alternative first gusset 35A), each of the first gussets 35 being disposed within a respective front portion 25. First gusset 35, as used herein, references either first gusset 35 and/or alternative first gusset 35A unless so stated. As shown, first gusset 35 has a first end 39 disposed within the front portion 25 proximate to longitudinal axis 11 so that when the blanket 10 is properly positioned upon the horse in use, the first end 39 is positioned to be proximate to the top of the scapula. Each first gusset 35 disposed within front portion 25 of blanket 10 has a second end 41 distal from first end 39. As shown in FIGS. 5-6, the second end 41 of exemplary first gusset 35 can be disposed within front edge 27 of front portion 25 so that the first gusset 35 ends at the front edge 27 of front portion 25. Alternatively, one of skill in the art will recognize that it would be possible to provide first gusset 35A to have a second end 41A that is distal from first end 39 but is formed within the perimeter of front portion 25.

In any regard, no matter the design of first gusset 35, first gusset 35 essentially bifurcates front portion 25 into neck portion 43 and scapula portion 45. Preferably, neck portion 43 is formed within blanket 10 so that the material constituting neck portion 43 correspondingly overlays the skin of the horse in the region disposed between the neck and scapula when the blanket 10 is wearingly placed upon the horse. In other words, first gusset 35 provides blanket 10 with a narrow strip of material that runs essentially parallel to the scapula and overlays the skin of the horse disposed between the scapula and neck. Practically and mechanically, first gusset 35 forms an articulable joint within front portion 25 between neck portion 45 and scapula portion 45 of blanket 10. Second end 41 of first gusset 35 can be elasticized if desired to allow for expansion and contraction of the first gusset 35 as the horse moves about.

As shown in FIG. 5A, an alternative embodiment of the blanket 10A can be also fitted with an alternative first gusset 35B disposed within a respective front portion 25. As shown, first gusset 35A has a first portion 51 having a first end 39 disposed within the front portion 25 proximate to longitudinal axis 11 so that when the blanket 10 is properly positioned upon the horse in use, the first end 39 of first gusset 35B is positioned to be proximate to the top of the scapula. First portion 51 terminates at a point distal from first end 39 that is proximate to the leading edge of the scapula located forward of the forearm. This is known to those of skill in the art as the 'point' of the shoulder. First portion 51 can overlap or otherwise lay parallel to the scapula of the horse.

Each first gusset 35B disposed within front portion 25 of blanket 10A has a second portion 53 with a first end co-located with the distal point of first portion 51 at the point of the shoulder and has a second end 41B distal therefrom. The second end 41B of exemplary first gusset 35B can be disposed within an edge 27A of front portion 25 so that the first gusset 35B ends at the edge 27A of front portion 25 located in front of the forearm. In practice first portion 51 and second portion 53 of first gusset 35B are formed from line segments in order to provide an easier design and easier process of manufacturing blanket 10A.

In any regard, first gusset 35B essentially bifurcates front portion 25 into neck portion 43 and scapula portion 45. In other words, first gusset 35B provides blanket 10A with a narrow linear strip of material that runs essentially parallel to the scapula and overlays the skin of the horse disposed between the scapula and neck. Practically and mechanically, first gusset 35B forms an articulable joint within front portion 25 between neck portion 45 and scapula portion 45 of blanket 10. Second end 41B of first gusset 35B can be elasticized if desired to allow for expansion and contraction of the first gusset 35B as the horse moves about.

In still yet another alternative embodiment, an alternative first gusset 35C can be disposed within a respective front portion 25. As shown, first gusset 35C has a first portion 51A having a first end 39 disposed within the front portion 25 proximate to longitudinal axis 11 so that when the blanket 10A is properly positioned upon the horse in use, the first end 39 of first gusset 35C is positioned to be proximate to the top of the scapula. First portion 51A can generally overlay the natural contour of the scapula of the horse and terminate at a point distal from first end 39 that is proximate to the point of the shoulder and forward of the forearm. First gusset 35C has a second portion 53A with a first end co-located with the distal point of first portion 51A and has a second end 41C distal therefrom. The second end 41C of exemplary first gusset 35C can be disposed within an edge 27A of front portion 25 so that the first gusset 35C ends at the edge 27A of front portion 25 located in front of the forearm. In practice first portion 51A and second portion 53A of first gusset 35C are formed from curvilinear segments in order to provide a design that more follows the natural contours of the horse both in a standing position and while moving.

Returning again to FIG. 5, if desired, a respective second gusset 37 forming a second articulable joint can be provided within each side portion 19 of blanket 10. Each second gusset 37 can be disposed between front portion 25 and barrel portion 21 near the front legs of the horse. Each second gusset 37 can be provided as a wedge-shaped piece of material gathered and/or pleated along the edge of horse blanket 10 and vertically oriented relative to the forearm of the horse. The bottom edge of each second gusset 37 can be elasticized. Practically and mechanically, each second gusset 37 forms an articulable joint between the front portion 25 and barrel portion 21 of each side portion 19 of blanket 10. Each second gusset 37 can be disposed over the elbow when the blanket 10 is wearingly placed upon the horse.

If so desired, rear leg straps can be attached to the blanket 10. For example, any rear leg straps can be elastic and adjustable in length. Exemplary rear leg straps preferably extend around the inside of the rear legs of the horse. The ends of the rear leg straps can be provided to clip on to "D"-rings or any other attachment device(s) that are secured to the blanket 10 by any necessary webbing and/or stitching.

Additionally, and if desired, at least one cinch (such as an elastic belly band or belly strap) can be provided. If desired, two cinches can be provided, one disposed proximate to the front legs and the other disposed proximate to the rear legs along the barrel of the horse. The cinches generally extend underneath the belly of the horse. The length of each cinch or strap can be adjustable and the ends can be clipped or hooked to rings or other attachment devices disposed upon, or in connecting engagement with, the blanket.

The blanket 10 is preferably provided with a withers notch 47 for reducing the wear on a horse's mane and a dock notch 49 for reducing the wear on a horse's tail. The withers notch 47 can be disposed proximate to the mane. Dock notch 49 can be disposed proximate to the tail when the horse blanket 10 is disposed upon the horse.

The withers notch 47 can be centrally located proximate to the longitudinal axis 11 and disposed on the center of the back portion 13 between the two front portions 25. The withers notch 47 opens to the neck opening 31. Thus, if the neck opening 31 can be itself considered as a notch, then the withers notch 47 can be considered a notch within a notch. The edge of the main notch can be lined with fleece if so desired.

As would be understood by one of skill in the art, the width and length of the withers notch 47 at the neck opening 31 should be sufficient so that the withers are uncovered by the blanket 10. The lower end of the mane can extend down to the withers. Thus, the withers notch 47 leaves the lower end of the mane exposed and consequently not subject to rubbing and/or chafing by any portion of blanket 10.

As should be understood by one of skill in the art, when the blanket 10 is wearingly placed upon the horse, the blanket 10 has a snug fit. This means that the blanket 10 takes into consideration the depth of the neck of the horse, the width of the chest of the horse, and the angle of the shoulder of the horse. This means that thee blanket 10 of the present disclosure can be particularly suitable for use on a variety of horses such as draft horses having thick necks and thoroughbreds having thinner necks. When a horse is out in a pasture and exposed to adverse weather, wind and rain are generally unable to enter the neck opening due to the close fit. To this end, the neck portions 43, the scapula portions 45, and side portions 19 of the blanket 10 can preferably fit close for the horse (i.e., are in direct contact with the horse) to provide a snug and adjustable fit due to the varying sizes of the chest, shoulders, and forearms of horses. Chest straps can be utilized with the blanket 10 to provide a snug fit to the horse.

The blanket 10 can be manufactured from a variety of materials. For example, a turnout blanket can be made of a waterproof nylon outer layer, a nylon liner or inner layer, and a poly-fill insulation disposed in-between. However, other materials besides nylon and poly-fill can be used. For example, the outer layer need not be waterproof. This is particularly true if the blanket is a stable blanket and meant for use inside of a stable or barn. In any regard, the blanket 10 can be manufactured from a variety of materials of different basis weights. Further, the blanket 10 can be provided with re-closeable access to the internal portions of the blanket in the form of a zipper, hook-and-loop fasteners, and other closure devices known to those of skill in the art to facilitate the addition or removal of insulative materials such as insulative batting from the interstices of the blanket 10 to provide for more or less thickness, more or less padding, more or less cooling devices, and the like. This can allow for the adaptation of the blanket 10 to suit the weather conditions or other situation currently experienced by the horse. Further a memory foam-like material can be applied to the inner surface of the blanket 10 in contact with the horse to provide for a softening effect while the blanket 10 is worn.

Further, as shown in FIGS. 5-6, webbing 51 can be provided to the side of the blanket 10 that contacts the horse. The webbing 51 can be disposed upon the blanket 10 to provide a means of mediating the wear observed by the use of current blankets about the withers. Thus, it was suitably found that disposing webbing material upon the blanket perpendicular to the longitudinal axis 11 and about the barrel as well as providing webbing 51 proximate to the withers notch 47 and disposed about either side of the withers notch 47 so that the underlying webbing 51 is disposed about either side of the neck can reduce the observed wear and/or rubbing on the withers. It is also believed that the placement of webbing 51 upon the blanket can also provide a manner to stabilize the blanket 10 and retard any movement of the blanket 10 when it is disposed upon the horse and the horse is in motion.

As shown in FIG. 5, blanket 10 can be provided with an aperture 29 that can allow and/or facilitate communication between opposed sides of blanket 10. By way of non-limiting example, aperture 29 can allow for the communication of a fastener or other device attached to another device or appurtenance disposed on or about the horse from under blanket 10 (such device or appurtenance underlying blanket 10) to the outwardly facing surface of blanket 10. In this way, the other device can be fixably attached to blanket 10 if the device has a fastener attached thereto (for example a snap) which can then be disposed through aperture 29 and fixably connected to the outer surface of blanket 10 via a corresponding connecting device (such as a D-ring) fixably attached to the outwardly facing surface of blanket 10.

By way of example, a yoke device 100 (discussed infra) can be disposed about the neck of a horse. The yoke device may have a fastener attached to the surface thereof. The fastener can then be disposed through aperture 29 and attached to a corresponding D-ring fixably attached to the outwardly facing surface of blanket 10. This interconnectability of devices about the horse can enhance the ability of each device by providing a seamless manner of overlaying disparate devices to provide a suitable mutually and matingly couplable equine adjustable blanket system 300 such as is discussed infra.

The blanket 10 can preferably allow the horse to exercise and move about freely as shown in FIGS. 6-7. This is because the areas of stress induced by horse movement and the tension, T, induced within the blanket as it tends to move rearward due top horse movement are elasticized by presence of the first gusset 35 and any second gusset 37 disposed within blanket 10 and reduced significantly, if not eliminated in totality. For example, if the horse walks or runs, the front legs are not constricted because first gusset 35 and any second gusset 37 disposed within blanket 10, preferably provided with the elasticized bottom edges and a gathered and/or a pleated material, can provide flexibility to the blanket in the area of the neck, shoulder, and front legs. The horse is thus able to move its front legs without being constricted to an unpleasant degree by the front aspects of the blanket and any incident rubbing and/or chafing is reduced and/or eliminated. When the horse stops running or walking, the blanket returns to its snug fit around the front legs of the horse. The rear legs are generally un-constricted by the blanket; and in any event, the elastic rear leg straps provide flexibility. Further, the presence of first gusset 35 within front portion 25 to provide neck portion 43 and scapula portion 45 dramatically reduce the instance of rubbing of the blanket 10 material to the fur and skin of the horse thus reducing the observed chafing and resulting edema.

If the horse bends its head down to eat at ground level, the neck opening 31 can provide flexibility. In a conventional, tight-necked blanket, the neck tends to push down on the bottom of the neck opening and pull on the top of the neck opening. With the blanket of the present invention, the horse is thus able to eat without feeling choked around the bottom of the neck opening. When the horse returns to its up position, the neck opening 31 continues to provide a snug fit.

If the neck opening 31 can be elasticized, any front straps and the first gussets 35 can provide flexibility at the stress areas of the blanket 10. Consequently, any straps, and their attachments to the blanket 10, are less likely to break or pull out from the blanket 10, thereby increasing the durability of the blanket 10. In addition, the horse can be content with a blanket 10 that does not restrict exercise, while remaining snug to keep the horse warm and dry.

B. The Yoke Device

The yoke device comprises a material having a "Y" shape and has a belly end, a withers end, and a main body portion. The withers end has a pair of elongate strips splaying outwardly from a central point disposed within the main body portion and forming a neck opening therebetween. The pair of elongate strips circumscribe the neck of the horse when the elongate strips are disposed about the neck of the horse. The main body portion overlaps the chest of the horse when the main body portion of the yoke device is disposed in overlapping engagement with the chest of the horse.

Figure 8:
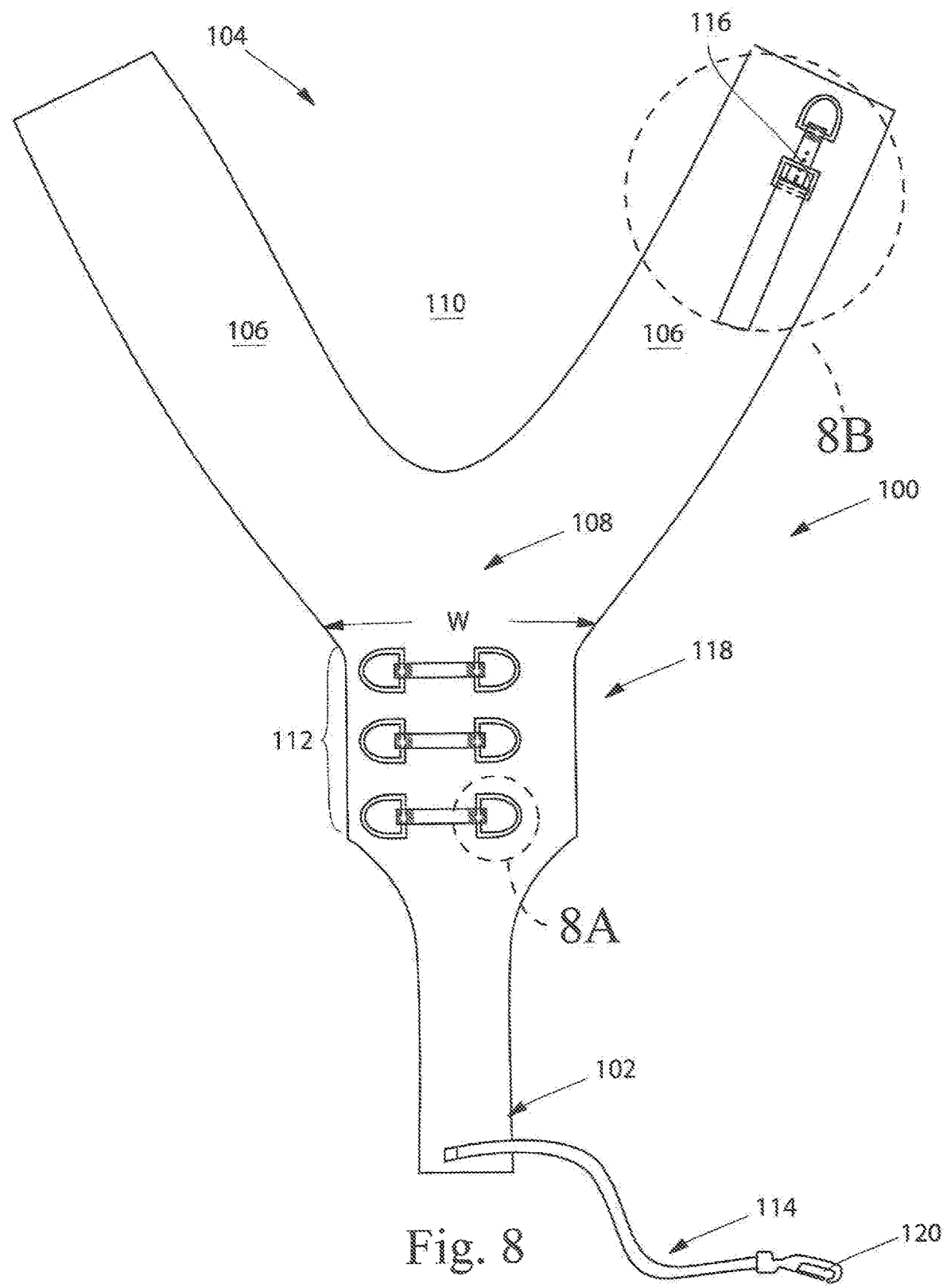
FIG. 8 is a plan view of an exemplary yoke of the present disclosure.
Figure 8A:
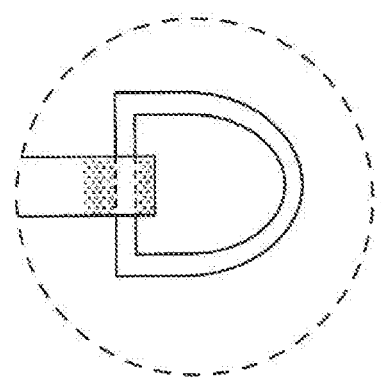
FIG. 8A is a plan view of the region labelled 8A of FIG. 8.
Figure 8B:
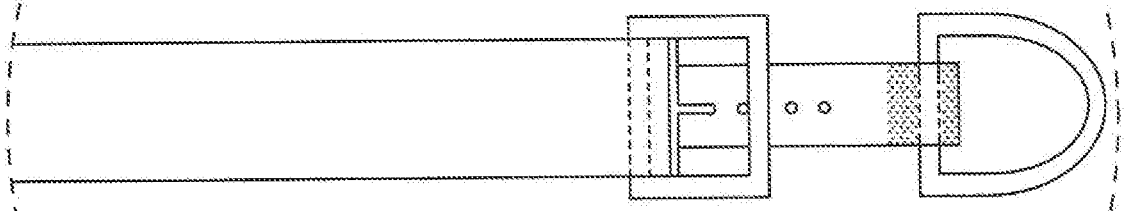
FIG. 8B is a plan view of the region labelled 8B of FIG. 8 where the elements comprising the yoke attachment device are separated into constituent elements.

Referring now to FIG. 8, a yoke device 100 (also referred to herein as yoke 100) can be provided as a singular piece of textile material for attachment of a horse blanket, warming, cooling, or otherwise keeping clean, the chest of a horse. The yoke 100 can be provided with a general "Y" shape and has a belly end 102, a withers end 104, and a main body portion 118. The withers end 104 can be characterized by having a pair of elongate strips 106 that splay outwardly from a central point 108 disposed within a main body portion 118 to form the "Y" shape.

As each of the elongate strips 106 splay outwardly from the central point 108, the region disposed therebetween forms a neck opening 110. In practice, it can be envisioned that the neck of the horse would be disposed within neck opening 110 and each of the elongate strips 106 can be disposed about the neck of the horse so that the elongate strips 106 can effectively circumscribe the neck of the horse when the elongate strips are placed in either cooperative coincidental mating engagement or cooperative overlapping engagement proximate to the withers.

If desired, yoke 100 can be provided with attached reinforcement webbing to increase the overall strength of the yoke 100. By way of non-limiting example, reinforcement webbing can be provided in overlapping and mating, contacting engagement with yoke 100 and have a shape geometrically similar to the overall "Y" shape of the yoke 100. Such reinforcement can not only provide increased strength to the yoke 100 but can also effectively allow any pressure induced into yoke 100 by a horse blanket cooperatively associated thereto to assist in keeping a horse blanket centered upon the back of the horse and away from interfering engagement with the shoulder and forearm of the horse.

Main body portion 118 of yoke 100 can provide essential and/or complete coverage of the chest of a horse when the main body portion 118 is disposed in overlapping engagement with the chest of a horse. To this end width adjustment devices 112 can be provided along the length of main body portion 118. Width adjustment devices 112 can effectively adjust the width, W, of the main body portion 118 in order to accommodate a horse with a large or wide chest such as a Belgian draft horse or a narrow chest such as a Saddlebred and Arabian horses.

It will also be appreciated by one of skill in the art that a leg strap 114 or a pair of opposed leg straps 114 can be fixably attached to the belly end 102 of yoke 100. A leg strap 114 can circumscribe both front legs of a horse and fixably attach to yoke 100 in order to place yoke 100 in fixed relation to the chest region of the horse dispose between both front legs. Alternatively, each of a pair of leg straps 114 can be fixably attached to belly end 102 of yoke 100. In this configuration, each leg strap 114 can circumscribe a singular front leg of a horse and be fixably attached to yoke 100. This configuration can provide the additional benefit by not only placing yoke 100 in fixed relation to the chest region of the horse dispose between both front legs but can also assist in maintaining the fixed relationship between the yoke 100 and the chest region of the horse as the horse maneuvers about in any of the natural gates (e.g., walk, trot, gallop, run).

The attachment of leg strap 114 can be accomplished by any manner known to those of skill in the art. For example, a hook and loop system can be deployed between an individual leg strap 114 and the belly end 102 of yoke 100. Alternatively, a fastener 120 (such as a carabiner) can be disposed upon an end of strap 114 distal from belly end 102. The fastener can then be attached to a mating fastener disposed upon belly end 102 or can be cooperatively self-attached to leg strap 114 itself by using a clip or other device for fastener 120.

Figure 9:
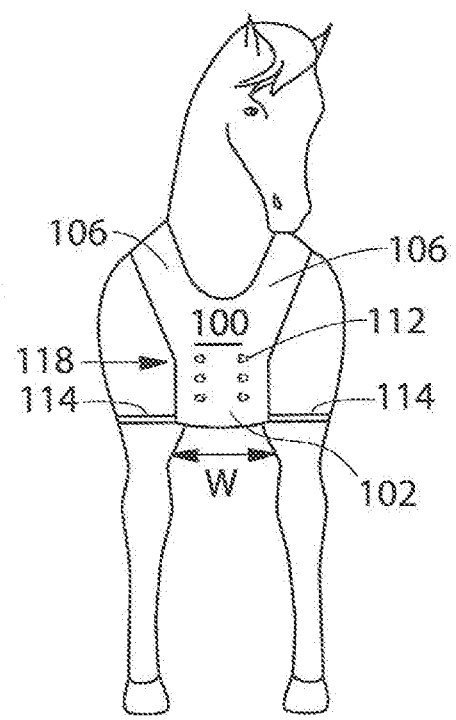
FIG. 9 is a front elevational view of the exemplary yoke of FIG. 8 shown on a horse.

As shown in FIG. 9, yoke 100 can be preferentially and cooperatively disposed upon the shoulders and chest of a horse. Each of the elongate straps 106 extending from main body portion 118 are disposed about the neck of the horse and placed into cooperative and mating engagement at the withers. Each of the leg straps 114 extend from belly end 102 and are disposed about a respective leg disposed proximate thereto. This placement of yoke 110 upon the horse with the heretofore mentioned connections disposes main body portion 118 in proximate and potentially contacting engagement with the chest of the horse. Each of the width adjustment devices 112 can be collectively or individually adjusted in the direction W in order to accommodate the chest width of the horse to provide maximum shielding of the chest.

Figure 10:
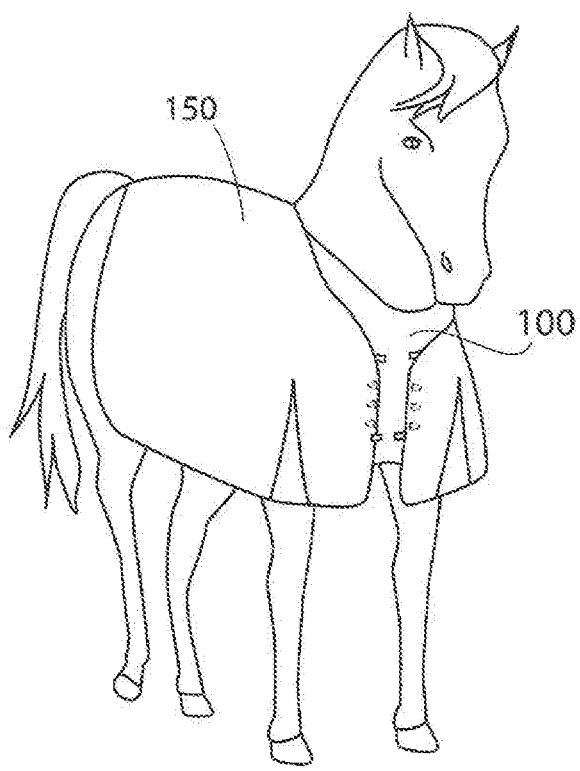
FIG. 10 is a front perspective view of the exemplary yoke of FIG. 8 in cooperative association with a horse blanket.

As shown in FIGS. 10-11, one of skill in the art will understand that yoke 100 can be provided on a horse as shown. For example, yoke 100 can be disposed about the neck of a horse as discussed supra. In short, elongate strips 106 are disposed about the neck of the horse and cooperatively engaged at the withers. Each of a pair of leg straps 114 are disposed about a proximate leg in order to cooperatively place the main body portion 118 of the yoke 100 proximate to the chest. A horse blanket 150 extending from the withers to the dock of the horse can then be disposed about the barrel of the horse.

One of skill in the art will readily recognize that the yoke 100 can readily provide a benefit of increased and better control of the adjustability relative to the fit of the horse blanket 150 and the horse. In short, it is believed by providing interconnectability and increased adjustability between yoke 100 and horse blanket 150 can readily accommodate the need to consider the depth of the neck of the horse, the width of the chest of the horse, and the angle of the shoulder of the horse. In other words, the above-mentioned considerations, when take into account in the current design can drastically reduce, and even eliminate, the number of friction points between the horse blanket 150 and the horse over previous designs. Further, current existing blankets provide too large and less adjustable neck opening. Stated simply, the current design and interactions possible with the yoke 100 and horse blanket 150 readily allow for an individualized customization for any particular breed or size of horse to allow for a better fit.

One of skill in the art will understand that the region proximate to both the yoke 100 and horse blanket 150 can be provided with an attachment device that provides for the connective engagement of yoke 100 with horse blanket 150. In this manner, a portion of horse blanket 150 proximate to yoke 100 can be overlaid upon that portion of yoke 100 proximate to horse blanket 150.

Alternatively, one of skill in the art will understand that the region proximate to both the yoke 100 and horse blanket 150 can be provided with an attachment device that provides for the connective engagement of yoke 100 with horse blanket 150 so that a portion of yoke 100 proximate to horse blanket 150 can be overlaid upon that portion of horse blanket 150 proximate to yoke 100.

The overlaying of a portion of yoke 100 with a portion of horse blanket 150 can provide for the fixable attachment of that portion of yoke 100 contacting horse blanket 150 with an attachment device disposed upon the distal ends of elongate strips 106 and a cooperative attachment device disposed upon the portion of horse blanket 150 disposed proximate to or in contacting engagement with yoke 100. For example, the distal ends of elongate strips 106 of yoke 100 can be provided with hooks and that portion of horse blanket 150 disposed proximate to or in contacting engagement with yoke 100 can be provided with loops to form a hook and loop system. Alternatively, as shown in FIG. 11, the distal ends of elongate strips 106 of yoke 100 can be provided with buckles 160 and that portion of horse blanket 150 disposed proximate to or in contacting engagement with yoke 100 can be provided with straps 170 to form a buckle system. Naturally, the proximate, contacting, and/or mating engagement of yoke 100 to horse blanket 150 will occur proximate to the neck of the horse and like disposed between the withers and shoulder.

It is believed that the yoke 100 can be provided as a retro-fit kit to extend the usefulness of existing horse blankets 150 already in use. One of skill in the art will readily recognize the cost effectiveness as well as the additional benefits of incorporating yoke 100 into a pre-existing horse blanket 150. For example, one benefit of incorporating a yoke 100 into a pre-existing horse blanket 150 is the ability to provide a more adjustable fit to the pre-existing horse blanket. In other words, the yoke device 100 can allow for a means of adjusting blanket 150 by taking into account the width of the chest and the depth of the neck thereby providing for a closer fit that reduces friction points and wind egress.

Another benefit of incorporating a yoke 100 into a pre-existing horse blanket 150 is the overall reduction in the amount of wind that can ingress between the neck and the neck opening of the horse blanket. Such ingressing wind can cool the horse unexpectedly and result in health-related issues. Thus, the benefit of coving the chest of the horse with a yoke 100 and cooperatively attach the yoke 100 to the pre-existing horse blanket 150 can effectively reduce and potentially eliminate such debilitating health-related issues by reducing or even eliminating the ability of wind to ingress underneath the horse blanket 150 and provide additional heretofore unrecognized warming, cooling, or cleanliness of the horse.

Additionally, horse blanket 150 can be provided with a cinch 180. Cinch 180 can effectively provide contacting engagement of the horse blanket 150 about the barrel of the horse.

C. Adjustable Blanket System

The equine adjustable blanket system provides a horse blanket and a yoke device. The horse blanket is disposable upon and in positionable in contacting engagement with the back of the horse and the yoke device is disposable upon and positionable in contacting engagement with the chest of the horse. The yoke device and the horse blanket are mutually and matingly couplable to each other to form the equine adjustable blanket system.

FIG. 12 provides for an exemplary equine adjustable blanket system 300. The blanket 325 can be provided for equine adjustable blanket system 300 as described supra with reference to FIG. 5. Additionally, yoke 350 can be provided for equine adjustable blanket system 300 as described supra with reference to FIG. 8. One of skill in the art will recognize that blanket 325 and yoke 350 are mutually and matingly couplable to each other to form equine adjustable blanket system 300. In other words, the horse blanket 325 is disposable upon and in contacting engagement with the back of the horse and the yoke device 350 is disposable upon and in contacting engagement with the chest of the horse. The horse blanket 325 and yoke device 350 are then interconnectable and preferably overlayable one over the other (e.g., a portion of horse blanket 325 overlays a portion of yoke device 350 or a portion of yoke device 350 overlays a portion of horse blanket 325) to form the equine adjustable blanket system 300.

The blanket 325 extends between the withers and the dock and generally follows the spine of the horse. The blanket 325 can be generally aligned with the horse's mane when the blanket is placed upon a horse. When the blanket 325 is deployed upon a horse, the back portion extends along the back of the horse, while each of the side portions depend down along the sides of the horse about the barrel. The side portions of the blanket 325 extend from the dock of the horse to the neck of the horse.

It may be preferred to provide the front portion 25 with front edges 27 that are designed to overlap at least slightly. It may be preferable to provide for the front portions 25 cover the chest area of the horse below the neck. A neck opening 31 can be formed in the blanket 10 between the front portions 25 and the withers end 15 of the back portion 13. The blanket 10 can be provided with a flap 33 disposed proximate to the dock end 17. Webbing 51 can be disposed upon the blanket 10 to provide a means of mediating the wear observed by the use of current blankets about the withers. Webbing 51 disposed about either side of the neck can reduce the observed wear and/or rubbing on the withers as well as stabilize the blanket 10 to retard movement of the blanket 10 when the horse is in motion.

Two opposed front portions of blanket 325 are capable of being coupled together using a strap and buckle or a plurality of hook and loop fasteners. When the opposed front portions are cooperatively overlapped, the respective front portions are retained in mating engagement.

Figures 13, 14:
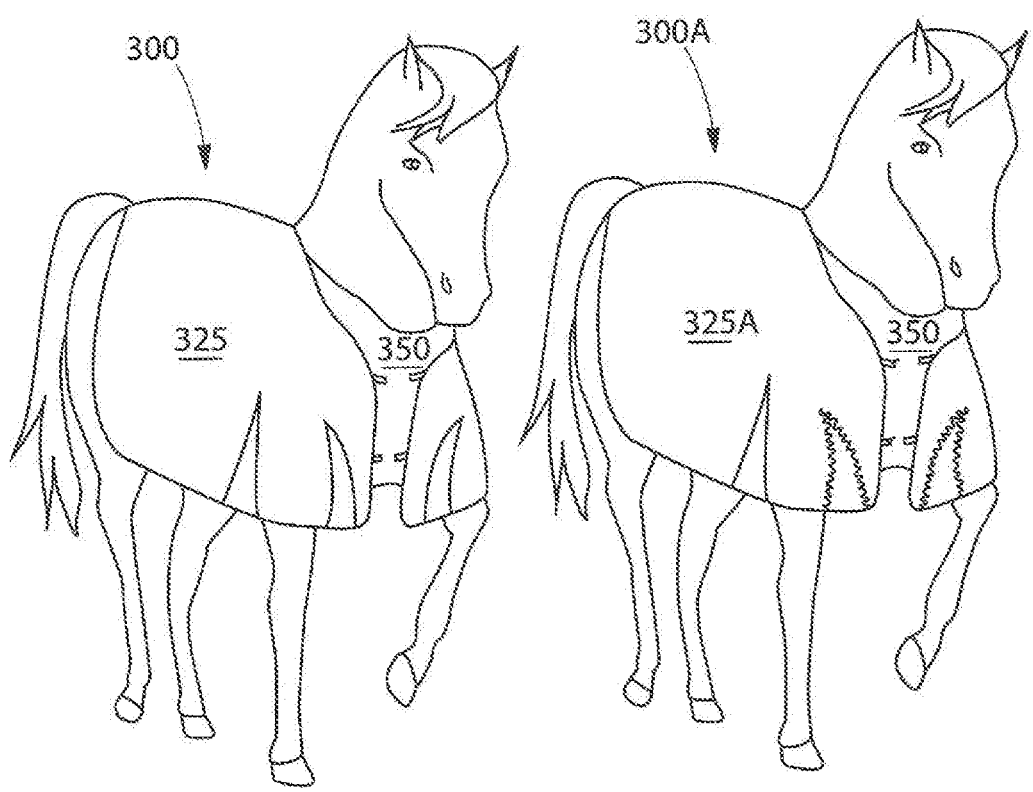
FIG. 13 is a front perspective view of an exemplary Equine Adjustable Blanket System of FIG. 12 on a horse.
FIG. 14 is a front perspective view of an alternative exemplary Equine Adjustable Blanket System on a horse.

The blanket 325 can also be fitted with at least two first gussets (selectable in design to have a gusset formed from a gathered material, a pleated material, combinations thereof, and the like to form blanket 325 as shown in FIG. 13 or have a gusset formed from elasticized material to form blanket 325A as shown in FIG. 14) are disposed within a front portion of blanket 325. The first gussets each have a first end disposed within the front portion of blanket 325 so that when the blanket 325 is properly positioned upon the horse in use, the first end of each gusset disposed within blanket 325 is positioned to be proximate to the top of the scapula. Each of the first gussets essentially bifurcate the front portion of blanket 325 into a neck portion and a scapula portion. The neck portion can be formed within blanket 325 so that the material constituting the neck portion lay on the skin of the horse in the region disposed between the neck and scapula. In other words, each first gusset provides blanket 325 with a narrow strip of material that overlays the skin of the horse between the scapula and neck. Stated yet another way, each first gusset forms an articulable joint within front portion of blanket 325 between the neck portion and scapula portion of blanket 325.

If desired, second gussets can be provided between the front portions and barrel portions near the front legs of the horse. If desired, rear leg straps can be provided upon the blanket 325. The rear leg straps can be elastic and adjustable in length and preferably extend around the inside of the rear legs of the horse. The ends of the rear leg straps can be provided to clip on to rings or other attachment devices secured to the blanket by any necessary webbing and/or stitching.

Additionally, and if desired, at least one elastic belly band or belly strap can be provided. If desired, two belly straps can be provided, one disposed proximate to the front legs and the other disposed proximate to the rear legs along the barrel of the horse. The belly straps can extend underneath the belly of the horse. The length of each belly strap can be adjustable, and the ends can be clipped or hooked to rings or other attachment devices disposed upon, or in connecting engagement with, the blanket.

A withers notch provided for blanket 325 can reduce the wear on a horse's mane. A dock notch can reduce the wear on a horse's tail. The withers notch can be preferably disposed proximate to the mane, while the dock notch is at the tail. The width and length of the withers notch can be sufficient so that the withers are uncovered by the blanket 325. The lower end of the mane can extend down to the withers. Thus, the withers notch can leave the lower end of the mane exposed and consequently not subject to wear.

The yoke device (or yoke) 350 can be provided as a singular piece of textile material for adjustable attachment of blanket 325, warming, cooling, or otherwise keeping clean, the chest of a horse. The yoke 350 can be provided with a general "Y" shape and have a belly end and a withers end. The withers end can be characterized by having a pair of elongate strips that splay outwardly from a central point to form the "Y" shape.

As each of the elongate strips splay outwardly from the central point to form a neck opening therebetween. The neck of the horse can be disposed within neck opening and each of the elongate strips can be disposed about the neck of the horse so that the elongate strips can effectively circumscribe the neck of the horse when the elongate strips are placed in either cooperative coincidental mating engagement or cooperative overlapping engagement.

The main body portion of yoke 350 can be intended to provide essential coverage of the chest of a horse. Width adjustment devices can be provided along the length of main body portion of yoke 350. Width adjustment devices can effectively adjust the width of the main body portion in order to accommodate a horse with a large or wide chest such as a Belgian draft horse or a narrow chest such as a Saddlebred and Arabian horses.

D. Connecting Device/Slidably Moveable Connector

The blanket 325 and yoke 350 can be connectively and matingly attached by any devices understood by one of skill in the art for providing mutual mating and connective attachment of one device to another.

Figure 15A:
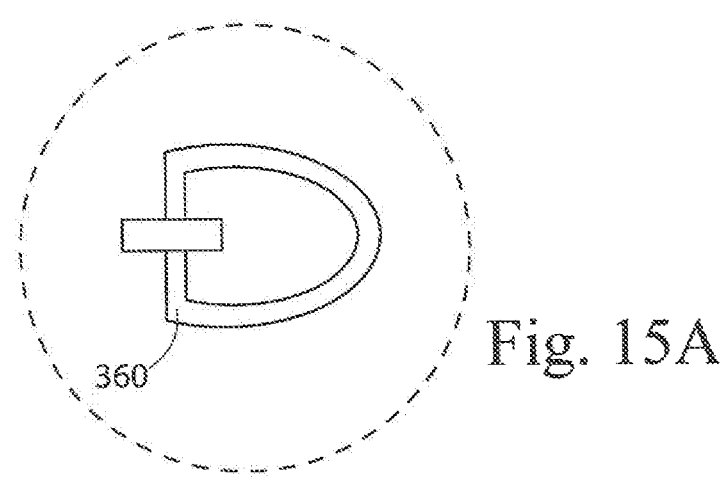
FIG. 15A is a plan view of the exemplary of the connecting device of FIG. 15; and, FIG. 15B is a plan view of the exemplary slidably moveable connector device of FIG. 15.
Figure 15B:
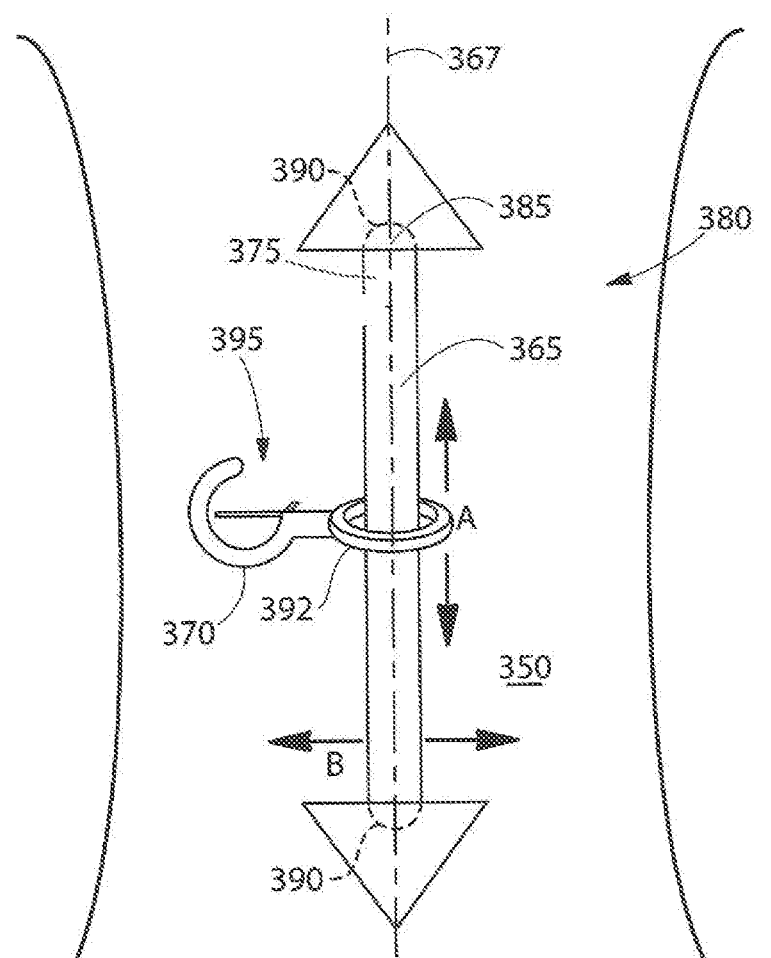
FIG. 15 is a front perspective view of an exemplary attachment device for providing mutual mating connection between a blanket and yoke of the Equine Adjustable Blanket System of FIG. 12.

One non-limiting example of such mutual mating attachment is shown in FIGS. 15, 15A, and 15B. As shown in FIG. 15, a plurality of corresponding connecting devices 360 such as an exemplary but non-limiting "D"-ring (shown in detail in FIG. 15A) can be fixably attached to the outwardly facing surface of yoke 350. Likewise, and as is shown in FIG. 15B, an elongate member 375 such as an amount of flexible cord 365 (e.g., cording, chain, rope, parachute cord, string, cable, combinations thereof, and the like) forming a slidably movable connector 380 can be fixably attached at first end 385 and second end 390, first end 385 and second end 390 being disposed distal one from the other, to a surface 390 such as the outwardly facing surface of yoke 350 or upon a side of blanket 325 facing the horse or upon an outwardly facing surface of blanket 325 disposed upon the horse. A plurality of snaps 370 having opposable connections can be connectively and slidably attached to elongate member 375 such as flexible cord 365 to form slidably movable connector 380. Any particular snap 370 is preferably translatable (i.e., can move) in a direction, A, generally parallel to the longitudinal axis 367 of elongate member 375 such as flexible cord 365. If elongate member 375 is provided as a flexible cord 365 having a general longitudinal axis 367, the elongate member 375 can be deformable in a direction, B, away from the longitudinal axis 367. Therefore, any particular snap 370 is preferably translatable in a direction, B, generally following, or consistent with, the direction of flexure (or deformation) of flexible cord 365 forming elongate member 375.

In one non-limiting use, one end of a snap 370 of slidably movable connector 380 can be slidably attached to elongate member 375 and the other end of the snap distal thereto can be cooperatively and connectively attached to a corresponding connective device 360 such as the exemplary "D"-ring of FIG. 15A. As would be recognized by one of skill in the art, in another non-limiting use, slidably movable connector 380 can be fixably attached to any surface of yoke 350. One end of a snap 370 of slidably movable connector 380 can be slidably attached to elongate member 375 and the other end of the snap distal thereto can be attached to the corresponding connective device 360 such as "D"-ring (of FIG. 15A) disposed upon the outwardly facing surface of blanket 325 through an aperture disposed within blanket 325. Alternatively, as would be recognized by one of skill in the art, in another non-limiting use, slidably movable connector 380 can be fixably attached to any surface of blanket 325. In any regard to the arrangement of the fixed disposition of slidably moveable connector 380 and corresponding connective device 360 upon either surface of blanket 325 and/or yoke 350, it is believed that due to the flexible nature of slidably moveable connector 380, cooperative attachment of the snap 370 and the corresponding connective device 360 can facilitate the yoke device 100 (interchangeably called "yoke device 350") and the horse blanket 150 (interchangeably called "blanket 325" or "horse blanket 325") to move freely relative to one another as the horse moves about as discussed infra. In short, slidably moveable connector 380 can facilitate and enhance the overlapping connective engagement of the yoke device 100 with a blanket 325 connectively engaged thereto.

Without desiring to be bound by theory, it is believed that having one end of a snap 370 attached to flexible cord 365 disposed upon the inside of the blanket 325 can facilitate the main body of the blanket 325 to flex and move more freely over the shoulder and forearm of the horse yet still provide secure attachment between the overlaid objects. This independent movement can reduce the tension in the blanket that causes rubbing, the observed chafing, and potential resulting edema. It is also believed, and would be readily recognized by one of skill in the art, that having one end of a snap 370 attached to the elongate member 375 of slidably movable connector 380 that is fixably attached to yoke 350 and is attached to a corresponding connective device 360 such as "D"-ring fixably attached to the outwardly facing surface of blanket 325 through an aperture positioned appropriately proximate thereto can facilitate the 'over-laying' of devices disposed upon the horse by allowing the yoke 350 to matingly attach directly to the blanket 325 and facilitate portions of the main body of the blanket 325 to flex independently due to the flexure of elongate member 375. Additionally, the various components overlaying the horse (e.g., the yoke 350 and blanket 325) are able to move freely relative to one another (i.e., flex independently) due to the flexure of elongate member 375 and thereby reduce any rubbing, chafing, and potential edema. Furthermore, one of skill in the art will recognize all of the benefits presented by the slidably moveable connector device 380 and understand the desirability of incorporating the slidably moveable connector device 380 into and/or onto a pre-existing article or device. A leg strap or a pair of opposed leg straps 180 can be fixably attached to the belly end of the yoke 350. Each leg strap can circumscribe a singular front leg of a horse and be fixably attached to yoke 350. This configuration can provide the additional benefit by not only placing yoke 350 in fixed relation to the chest region of the horse dispose between both front legs but can also assist in maintaining the fixed relationship between the yoke 350 and the chest region of the horse as the horse maneuvers about in any of the natural gates (e.g., walk, trot, gallop, run).

The yoke 350 can be preferentially and cooperatively disposed upon the shoulders and chest of a horse. Each of the elongate straps extending from the main body portion can be disposed about the neck of the horse and placed into cooperative and mating engagement at the withers. Each of the leg straps extending from the belly end and are disposed about a respective leg disposed proximate thereto. This placement of yoke 350 upon the horse with the heretofore mentioned connections, such as slidably movable connector 380, can dispose the main body portion in proximate and potentially contacting engagement with the chest of the horse. Each of the width adjustment devices can be collectively or individually adjusted in order to accommodate the chest width of the horse to provide maximum shielding of the chest.

Any dimensions and/or values disclosed herein are not to be understood as being strictly limited to the exact numerical values recited. Instead, unless otherwise specified, each such dimension and/or value is intended to mean both the recited dimension and/or value and a functionally equivalent range surrounding that dimension and/or value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A yoke device for a horse having a neck, a chest, at least one shoulder, and at least one scapula, said yoke device comprising:
   a) a material having a "Y" shape and having a belly end, a withers end, and a main body portion;
   b) wherein said withers end comprises a pair of elongate strips splaying outwardly from a central point disposed within said main body portion and forming a neck opening therebetween, said pair of elongate strips circumscribing said neck of said horse when said pair of elongate strips are disposed about said neck of said horse;
   c) width adjustment devices disposed upon said main body portion, each of said width adjustment devices adjusting a width, W, of said main body portion; and,
   d) wherein said main body portion overlaps said chest of said horse when said main body portion of said yoke device is disposed in overlapping engagement with said chest of said horse.

2. The yoke device of claim 1, wherein said main body portion contacts said chest of said horse when said main body portion of said yoke device is disposed in overlapping engagement with said chest of said horse.

3. The yoke device of claim 1, further comprising a pair of opposed leg straps fixably attached to said belly end of said yoke device.

4. The yoke device of claim 3, wherein each of said pair of opposed leg straps circumscribe a corresponding leg of said horse when said yoke device is disposed in overlapping engagement with said chest of said horse.

5. The yoke device of claim 3, further comprising a fastener disposed upon an end of each of said pair of opposed leg straps distal from said belly end.

6. The yoke device of claim 1, further comprising a leg strap fixably attached to said belly end of said yoke, said leg strap circumscribing both legs of said horse when said yoke device is disposed in overlapping engagement with said chest of said horse.

7. The yoke device of claim 1, wherein each of said pair of elongate strips circumscribe at least a portion of said neck of said horse and are placed in cooperative coincidental mating engagement proximate to said withers when said elongate strips are disposed about said neck of said horse.

8. The yoke device of claim 1, wherein said width adjustment devices adjust said width, W, of said main body portion when said yoke device is disposed in overlapping engagement with said chest of said horse.

9. The yoke device of claim 1, wherein said yoke device is provided in cooperative association and mating engagement with a horse blanket.

10. The yoke device of claim 9, wherein said yoke device and said horse blanket are mutually and matingly couplable to each other to form an equine adjustable blanket system.

11. The yoke device of claim 9, wherein said yoke device and said horse blanket are configured to be cooperatively associated and matingly engaged proximate to said neck of said horse.

12. The yoke device of claim 1, further comprising reinforcement webbing attached thereto.

13. The yoke device of claim 1, wherein said yoke device is incorporable into a pre-existing horse blanket.

* * * * *